(12) United States Patent
Van Overveld et al.

(10) Patent No.: US 6,519,350 B1
(45) Date of Patent: Feb. 11, 2003

(54) EMBEDDING WATERMARKS IN IMAGES

(75) Inventors: Cornelis W. A. M. Van Overveld, Eindhoven (NL); Peter M. J. Rongen, Eindhoven (NL); Maurice J. J. J.-B. Maes, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/477,220

(22) Filed: Jan. 4, 2000

(30) Foreign Application Priority Data

Jan. 15, 1999 (EP) .............................................. 99200123

(51) Int. Cl.[7] .............................. G06K 9/66; G06K 9/00
(52) U.S. Cl. ...................... 382/100; 382/193; 382/194; 347/131; 347/136; 358/298; 358/296
(58) Field of Search ................................. 382/100, 193, 382/194; 374/131, 136; 358/298, 296

(56) References Cited

U.S. PATENT DOCUMENTS

| | | | | |
|---|---|---|---|---|
| 5,530,759 A | * | 6/1996 | Braudaway et al. | 380/54 |
| 5,825,892 A | * | 10/1998 | Braudaway et al. | 380/51 |
| 5,831,657 A | * | 11/1998 | Sakaue et al. | 347/131 |

OTHER PUBLICATIONS

M.J.J.B. Maes and C.W.A.M. Van Overveld: "Digital Watermarking by Geometric Warping", Proceedings of the 1998 International Conference on Image Processing, Oct. 4–7, 1998, pp. 424–426.

C. Harris and M. Stephens, "A Combined Corner and Edge Detector", Proceedings of the $4^{TH}$ Alvery Vision Conference, 1988, pp. 147–151.

* cited by examiner

Primary Examiner—Leo Boudreau
Assistant Examiner—Tom Y Lu
(74) Attorney, Agent, or Firm—Russell Gross

(57) ABSTRACT

A method and arrangement for embedding a watermark in an image are disclosed. The watermark consists of a pseudo-random, dense subset of image pixels, e.g. a pattern of lines (20). A number of salient image pixels (21–26), for example, local extremes, corners or edges, is identified and it is determined whether they lie on (i.e. within a vicinity $\delta$ of) the line pattern (21–23) or not (24–26). In an unwatermarked image (FIG. 2A), the number of most salient pixels (21) lying on the watermark is substantially the same as the number of most salient pixels (25,26) not lying on the watermark. The image is watermarked (FIG. 2B) by modifying the saliency of the salient pixels in such a way that a significant majority (21,23) of the most salient pixels (21, 23,25) is eventually located within the vicinity of the line pattern.

7 Claims, 3 Drawing Sheets

EMBEDDING WATERMARKS IN IMAGES

FIELD OF THE INVENTION

The invention relates to a method of embedding a watermark in an image, comprising the steps of calculating a saliency of image pixels, identifying salient image pixels, and processing the image in such a way that a predetermined percentage of the most salient image pixels lies within the vicinity of a predetermined watermark pattern. The invention also relates to an arrangement for embedding a watermark in an image.

BACKGROUND OF THE INVENTION

A known method of embedding a watermark as defined in the opening paragraph is disclosed in M. J. J. B. Maes and C. W. A. M. van Overveld: "Digital Watermarking by Geometric Warping", Proceedings of the 1998 International Conference on Image Processing, Oct. 4–7, 1998, pages 424–426. In this known method, the watermark is a predetermined image pattern, for example, a pattern of lines. The image is watermarked if a statistically high percentage of salient pixels of the image lies within the vicinity of the watermark pattern. This is achieved by identifying the salient pixels, and moving ("warping") them to the vicinity of the watermark pattern. The step of image processing thus comprises locally changing the geometrical characteristics of the image.

OBJECT AND SUMMARY OF THE INVENTION

It is an object of the invention to embed the watermark using an alternative method of image processing.

To this end, the method in accordance with the invention is characterized in that the step of processing the image comprises modifying the saliency of salient pixels. The watermark is thus embedded by modifying the saliency of image pixels instead of moving them to different positions. The saliency is modified by decreasing the saliency of most salient pixels not lying within the vicinity of the watermark pattern and/or increasing the saliency of salient pixels lying within the vicinity of the watermark pattern. Advantageous embodiments of identifying and modifying salient pixels are defined in the dependent claims.

DESCRIPTION OF EMBODIMENTS

Figure 1:
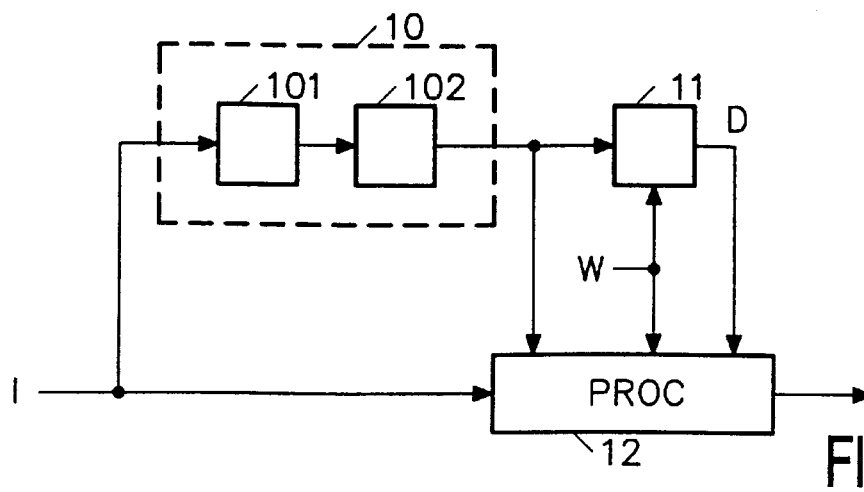
FIG. 1 shows schematically an arrangement for embedding a watermark in an image in accordance with the invention.

FIG. 1 shows an embodiment of an arrangement for embedding a watermark in an image in accordance with the invention. The arrangement comprises a salient point extraction module 10, a decision module 11, and an image-processing module 12. The arrangement receives an input image I and a watermark W, and generates a watermarked image $I_W$.

Figure 2A:
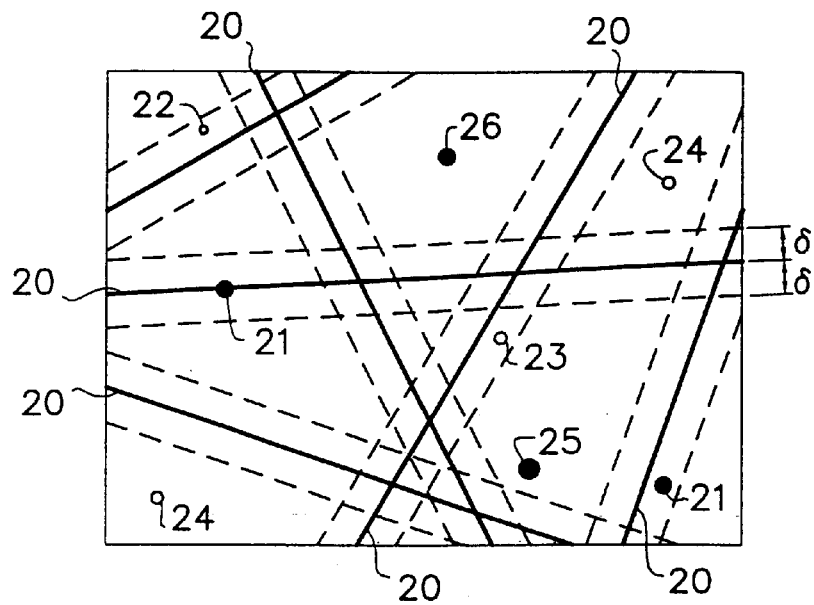
FIGS. 2A and 2B show watermark patterns and salient pixels to illustrate the operation of the arrangement which is shown in FIG. 1.

FIG. 2A shows an example of the watermark. In this example, the watermark W is assumed to be a pattern of lines 20, but this is not essential. Salient pixels are shown as circles 21–26 in the Figure. The diameter of a circle represents the saliency of the pixel. A pixel is said to lie in the vicinity of the watermark, if the distance from that pixel to the nearest line 20 is less than a predetermined value. This predetermined distance may be a fixed value δ. This definition of vicinity, where the lines 20 have a "thickness" 2δ, will be adhered to throughout the rest of the description. The expression "lie in the vicinity of the watermark" will often also be referred to as "lie on the watermark". In FIG. 2A, the pixels 21–23 lie on the watermark, whereas pixels 24–26 do not.

Alternatively, the expression "lie in the vicinity of the watermark" can be defined to mean that the saliency-to-distance ratio has a predetermined minimum value. Thus, pixel 25 in FIG. 2A may lie in the vicinity of the watermark whereas, say, pixel 22 does not, because the larger distance of pixel 25 to the nearest line 20 is compensated by its larger saliency.

The watermark pattern W has a given density. This is understood to mean that the watermark pattern including its vicinity covers a given portion (p) of the image. Hereinafter, it will be assumed that the watermark covers p=50% of the image. Accordingly, about p=50% of the salient pixels of an unwatermarked image will lie on the watermark.

The arrangement shown in FIG. 1 operates as follows. The salient pixel extraction module 10 comprises saliency-calculating means 101 for calculating the saliency of the image pixels. Embodiments thereof will be described later. The module 10 further comprises a selection circuit 102, which selects salient pixels. The number of salient pixels is small compared with the total number of image pixels. The salient pixels are reasonably uniformly distributed across the image, so as to avoid that modifying the saliency of a pixel affects an earlier change of a nearby salient pixel. This can be achieved, inter alia, by dividing the image into blocks and selecting one or a few salient pixels per block. It can also be achieved by requiring a minimal distance between salient points. As already mentioned, the pixels 21–26 in FIG. 2A are salient pixels.

The salient pixels and their saliencies are applied to the decision module 11. This module receives the watermark pattern W and determines which portion of the most salient pixels lie on the watermark. In an unwatermarked image, a percentage p (here p=50%) of the most salient pixels will lie on the watermark. In FIG. 2A, the most salient pixels are shown as solid circles. Of these most salient pixels, the pixels 21 lie on the watermark whereas the pixels 25 and 26 do not. If the percentage of the most salient pixels lying on the watermark W does not substantially differ from p=50%, the decision module 11 generates a decision signal D=0. In response to this signal, the image-processing module 12 modifies the saliency of the salient pixels in such a way that a significant percentage of the most salient pixels will lie on the watermark. Note that the extraction module 10 and decision module 11 jointly constitute a watermark detector.

Figure 2B:
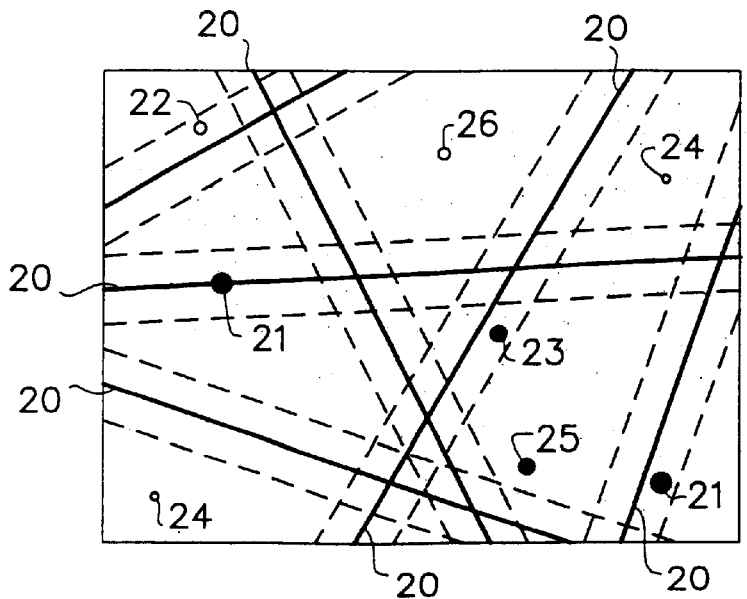

The image-processing module 12 decreases the saliency of salient pixels not lying on the watermark and/or increases the saliency of salient pixels lying on the watermark. FIG. 2B shows the saliencies of the salient pixels 21–26 after modification. The saliencies of the pixels 21–23 lying on the watermark are increased, the saliencies of the pixels 24–26 not lying on the watermark are decreased. The process of modifying turns "nearly most salient pixels" into most salient pixels and vice versa. In FIG. 2B, the pixel 23 lying on the watermark is now one of the most salient pixels and thus shown as a solid circle. The pixel 26 not lying on the watermark is no longer one of the most salient pixels. Thus, three of the four most salient pixels lie on the watermark after the process of modification.

Figure 3A:
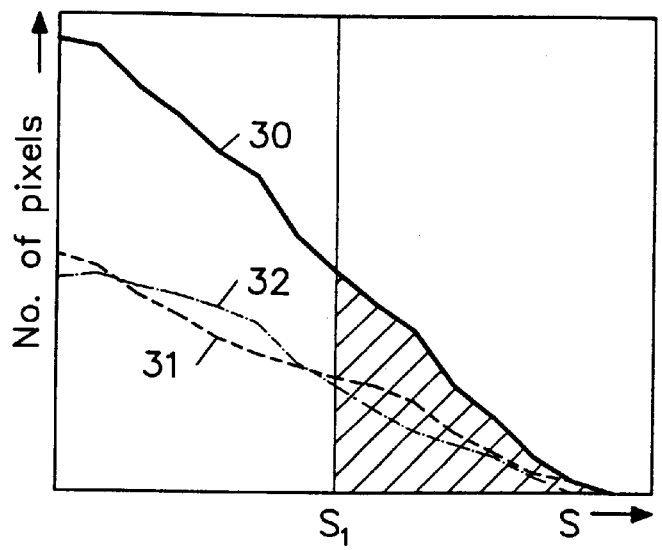
FIGS. 3A and 3B show histograms to illustrate the operation of the arrangement which is shown in FIG. 1.
Figure 3B:
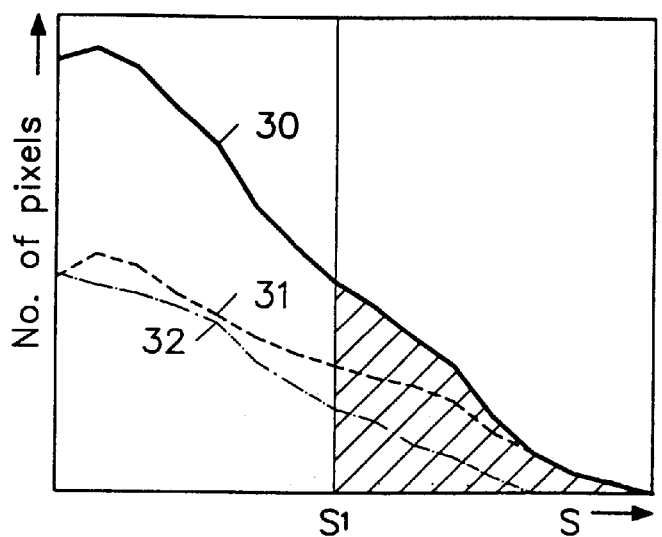

FIGS. 3A and 3B illustrate the process in the form of histograms. Reference numeral 30 is a graph of the number of salient pixels versus saliency. Numeral 31 denotes the pixels lying on the watermark pattern W, numeral 32 denotes pixels not lying on the watermark. The shaded area denotes the set of most salient pixels. In this example, the set includes all pixels having a saliency which is larger than a given value $S_1$. Alternatively, the set may have a predetermined number of most salient pixels. FIG. 3A shows the histogram of an unwatermarked image, having 55% of the most salient pixels lying on the watermark. FIG. 3B shows the histogram after increasing the saliency of pixels lying on the watermark (which shifts line 31 to the right) and decreasing the saliency of pixels not lying on the watermark (which shifts line 32 to the left). After this step, 70% of the most salient pixels lies on the watermark.

Figure 4:
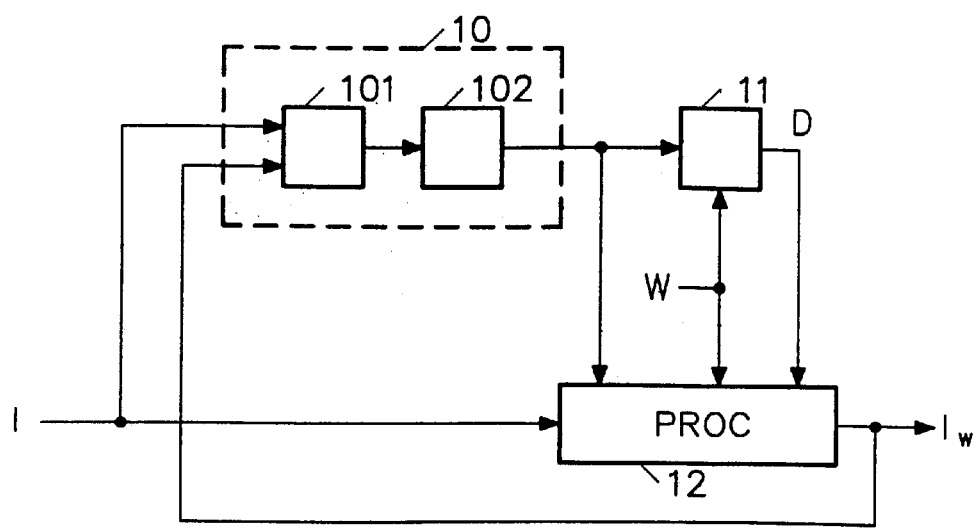
FIG. 4 shows a further embodiment of the arrangement for embedding a watermark in an image in accordance with the invention.

In a preferred embodiment of the arrangement, the process of modifying saliency may be repeated until a predetermined majority, e.g. 75%, of the most salient pixels has been found to lie on the watermark. Such an embodiment is shown in FIG. 4. The arrangement differs from the one which is shown in FIG. 1 in that the processed image $I_W$ is fed back to the extraction module 10 until a significant percentage of the most salient pixels has been found to lie on the watermark, and the decision module 11 generates the signal D=1.

The step of increasing the saliency of a pixel, which is carried out by the image-processing module 12, implies locally adding a luminance and/or chrominance image $\Delta I$ to the image I in such a way that the saliency S is amplified. Similarly, decreasing the saliency of a pixel implies adding a luminance and/or chrominance image $\Delta I$ to the image I in such a way that the saliency S is attenuated. In view thereof, it will be appreciated that the method of modifying is strongly related to the method of calculating the saliency.

In one embodiment of the arrangement in accordance with the invention, a 2-dimensional filter forms the saliency-calculating means 101. Such a filter will hereinafter be represented by a matrix F, for example, the following 3*3 matrix:

$$F = \begin{bmatrix} f_{-1,-1} & f_{-1,-0} & f_{-1,-1} \\ f_{0,-1} & f_{0,0} & f_{0,1} \\ f_{1,-1} & f_{1,0} & f_{1,-1} \end{bmatrix}$$

The saliency $S_{i,j}$ of pixel $I_{i,j}$ (where i and j denote the vertical and horizontal pixel positions, respectively) is defined by the following equation:

$$S_{i,j} = f_{-1,-1}I_{i-1,j-1} + f_{-1,0}I_{i-1,j} + f_{-1,1}I_{i-1,j+1} + \\ f_{0,-1}I_{i,j-1} + f_{0,0}I_{i,j} + f_{0,1}I_{i,j+1} + \\ f_{1,-1}I_{i+1,j-1} + f_{1,0}I_{i+1,j} + f_{1,1}I_{i+1,j+1}$$

(Eq. 1)

In one embodiment of the invention, the filter F is a Laplace filter. This is a high-pass filter which returns values that are indicative of local minima and maxima of the pixel values. It returns the value zero if the pixel value $I_{i,j}$ is equal to the average of its neighbors. The 3*3 Laplace filter is represented by the matrix:

$$F = \begin{bmatrix} -1 & -1 & -1 \\ -1 & 8 & -1 \\ -1 & -1 & -1 \end{bmatrix}.$$

In this embodiment, the saliency $S_{i,j}$ of a pixel is modified by adding a weighted version of the matrix F to the image. In mathematical notation:

$$I_m = I + \lambda F \text{ to increase the saliency,} \quad \text{(Eq. 2)}$$

and $$I_m = I - \lambda F \text{ to decrease the saliency.} \quad \text{(Eq. 3)}$$

where $\lambda$ is a given weighting factor, I is a 3*3 sub-image having the salient pixel in the center, and $I_m$ is the modified 3*3 sub-image.

Figure 5:
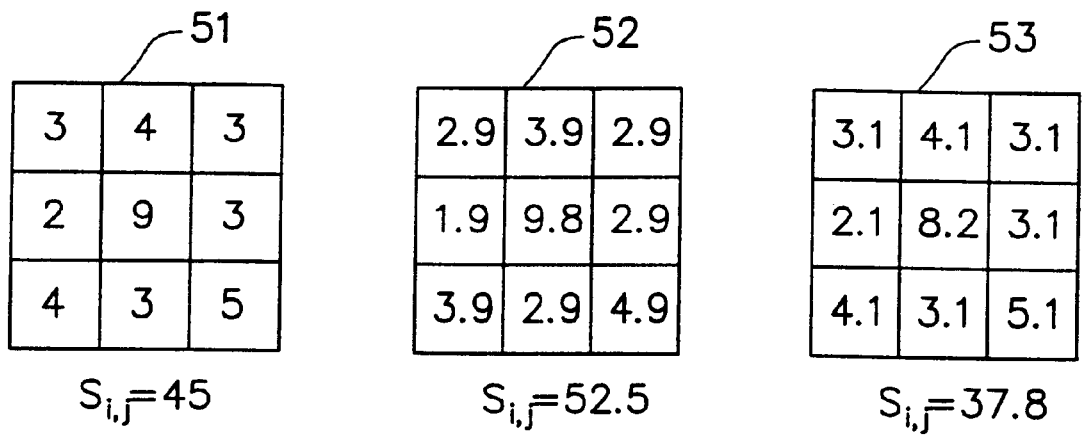
FIGS. 5 and 6 show sub-images to illustrate the operation of alternative options for identifying and modifying salient pixels.

FIG. 5 shows an example of this modification process. Numeral 51 denotes a 3*3 sub-image with a salient pixel having an intensity $I_{i,j}=9$ in the center. The pixel has a saliency $S_{i,j}=45$ in accordance with Eq. 1. Numeral 52 denotes the sub-image after processing in accordance with Eq. 2 and $\lambda=0.1$, which increases the saliency to $S_{i,j}=52.5$. Numeral 53 denotes the sub-image after processing in accordance with Eq. 3 and $\lambda=0.1$, which decreases the saliency to $S_{i,j}=37.8$.

An alternative method of increasing the saliency $S_{i,j}$ is based on the recognition that $S_{i,j}$ is already large, and that the sub-image I itself may be used to amplify the saliency, i.e.: $I_m = I + \lambda I$.

In another embodiment of the arrangement, the saliency-calculating means 101 is formed by an edge and/or corner detector, the saliency of a pixel being represented by the edge or corner strength. Corner detectors are known per se. An advantageous embodiment is described in C. Harris and M. Stephens: "A Combined Corner and Edge Detector", Proceedings of the $4^{th}$ Alvey Vision Conference, 1988, pages 147–151. This corner detector is defined by a matrix:

$$M = w(x, y) * \begin{bmatrix} I_x^2 & I_x I_y \\ I_x I_y & I_y^2 \end{bmatrix}$$

where $$w(x, y) = e^{\frac{x^2+y^2}{2\sigma^2}}$$

is a Gaussian function with standard deviation $\sigma$, the symbol * denotes convolution, and $$I_x = \frac{\partial I}{\partial x} \text{ and } I_y = \frac{\partial I}{\partial y}$$

are the partial derivatives of the image in the directions x and y, respectively. The matrix M can be relatively easily calculated by using the following discrete approximations:

$$w(x, y) = \frac{1}{13}\begin{bmatrix} 1 & 1 & 1 \\ 1 & 5 & 1 \\ 1 & 1 & 1 \end{bmatrix},$$

-continued $$I_x = \begin{bmatrix} -1 & -2 & -1 \\ 0 & 0 & 0 \\ 1 & 2 & 1 \end{bmatrix} * I, \text{ and}$$

$$I_y = \begin{bmatrix} -1 & 0 & 1 \\ -2 & 0 & 2 \\ -1 & 0 & 1 \end{bmatrix} * I.$$

The matrix M, which can be written in the form $$M = \begin{bmatrix} A & C \\ C & B \end{bmatrix},$$

has a determinant $D=AB-C^2$ and a trace $T=A+B$. The corner strength R is now defined by:

$R=D-kT^2$ where k is a suitable constant, for example, k=0.01. The corner strength R is positive for a corner, negative for an edge, and approximately zero in a flat region.

Figure 6:
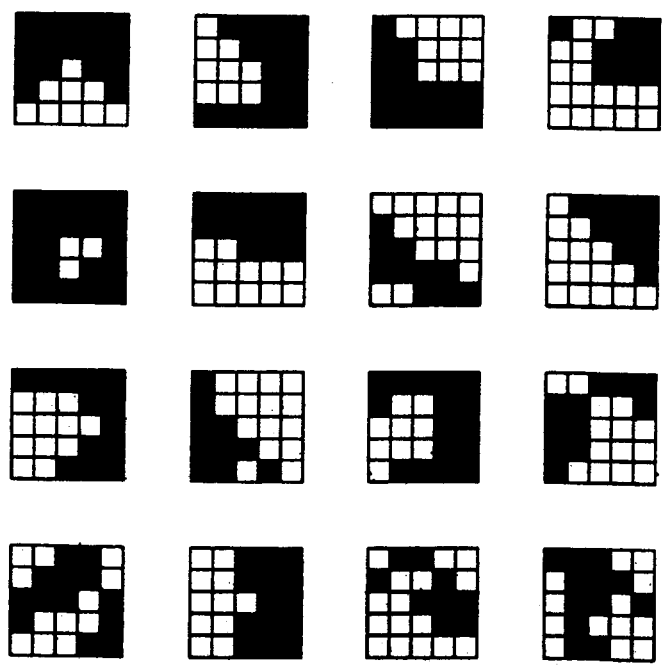

FIG. 6 shows some examples of 5*5 sub-images, the center pixels of which were found to have a large corner strength. Although the pixels have multi-bit luminance and chrominance levels, the sub-images are here shown as binary images, that is, pixels having intensities larger than a mean or median value are shown in white and pixels having intensities less than said mean or median value are shown in black. Note that for some sub-images it is immediately clear that the center pixel is indeed a corner, whereas for some it is not.

Amplifying the corner strength is achieved by increasing the contrast between the pixels that represent the corner and the complementary pixels, for example, by adding an amount ΔI to the intensities of the white pixels in FIG. 6 and/or subtracting an amount ΔI from the black pixels in FIG. 6. Weakening the corner strength is obtained by the inverse operation, i.e. subtracting ΔI from the white pixels and adding ΔI to the black pixels.

In the foregoing, it has been assumed that an image is watermarked if a significant percentage of salient pixels lies in the vicinity of the watermark pattern. It will be appreciated, however, that the complementary definition may be used in practice, i.e. that an image is watermarked if a significant percentage of salient pixels lies outside the vicinity of the watermark pattern.

It is further noted that insufficient salient pixels may be found in certain areas of the input image. This may be particularly the case in uniform areas of synthetic images such as cartoons. In this case, salient pixels lying on the watermark can be created, inter alia, by adding particular noise patterns to said areas of the image, by adding intensities corresponding to the filter coefficients of the Laplace filter, or by artificially creating corners.

In summary, a method and arrangement for embedding a watermark in an image are disclosed. The watermark consists af a pseudo-random, dense subset of image pixels, e.g. a pattern of lines (20). A number of salient image pixels (21–26), for example, local extremes, corners or edges, is identified and it is determined whether they lie on (i.e. within a vicinity δ of) the line pattern (21–23) or not (24–26). In an unwatermarked image (FIG. 2A), the number of mast salient pixels (21) lying on the watermark is substantially the same as the number of most salient pixels (25,26) not lying on the watermark. The image is watermarked (FIG. 2B) by modifying the saliency of the salient pixels in such a way that a significant majority (21,23) of the most salient pixels (21, 23,25) is eventually located within the vicinity of the line pattern.

What is claimed is:

1. A method of embedding a watermark in an image, comprising the steps of calculating (101) a saliency ($S_{i,j}$) of image pixels, identifying (102) salient image pixels (21–26), and processing the image in such a way that a predetermined percentage of the most salient image pixels (21,25,26) lies within the vicinity (δ) of a predetermined watermark pattern (20), wherein said step of image processing includes modifying (12) the saliency of salient pixels (23,26) by decreasing the saliency of most salient pixels not lying within the vicinity of the watermark pattern.

2. A method of embedding a watermark in an image, comprising the steps of calculating (101) a saliency ($S_{i,j}$) of image pixels, identifying (102) salient image pixels (21–26), and processing the image in such a way that a predetermined percentage of the most salient image pixels (21,25,26) lies within the vicinity (δ) of a predetermined watermark pattern (20), wherein said step of image processing includes modifying (12) the saliency of salient pixels (23,26), wherein the step of calculating the saliency of pixels includes filtering the image, and the step of image processing includes changing the pixel intensities of a sub-image including a salient pixel to modify the response of said filter in accordance with a desired modification of the saliency of said salient pixel.

3. A method as claimed in claim 2, wherein the filter is a 2-dimensional filter, and the step of modifying the saliency comprises creating a linear combination of the sub-image and the filter coefficients of said filter.

4. A method as claimed in claim 2, wherein the filter is a corner detection filter the response of which represents a corner strength, and the step of modifying comprises changing the pixel intensities of the sub-image to modify said corner strength.

5. A method as claimed in claim 1, further comprising the step of feeding back the processed image and repeatedly carrying out the steps of calculating, identifying and processing until the significant percentage of the most salient image pixels lies within the vicinity of the watermark pattern.

6. A method of embedding a watermark in an image, comprising the steps of calculating (101) a saliency ($S_{i,j}$) of image pixels, identifying (102) salient image pixels (21–26), and processing the image in such a way that a predetermined percentage of the most salient image pixels (21,25,26) lies within the vicinity (δ) of a predetermined watermark pattern (20), creating salient pixels in uniform image areas by adding predetermined pixel patterns to said areas, wherein said step of image processing includes modifying (12) the saliency of salient pixels (23,26).

7. An arrangement for embedding a watermark (W) in an image (I), comprising means (101) for calculating a saliency ($S_{i,j}$) of image pixels, means (102) for identifying salient image pixels, and means (12) for processing the image in such a way that a predetermined percentage of the most salient image pixels lies within the vicinity (δ) of a predetermined watermark pattern (20), wherein said image-processing means (12) is arranged to modify the saliency of salient pixels by decreasing the saliency of most salient pixels not lying within the vicinity of the watermark pattern.

* * * * *